(12) United States Patent
Shingyouchi

(10) Patent No.: US 6,650,172 B1
(45) Date of Patent: Nov. 18, 2003

(54) BOOST CIRCUIT WITH SEQUENTIALLY DELAYED ACTIVATION OF PUMP CIRCUIT STAGES

(75) Inventor: Kenji Shingyouchi, Kanagawa (JP)

(73) Assignee: NEC Electronics Corporation, Kanagawa (JP)

( * ) Notice: Subject to any disclaimer, the term of this patent is extended or adjusted under 35 U.S.C. 154(b) by 32 days.

(21) Appl. No.: 09/609,257

(22) Filed: Jun. 30, 2000

(30) Foreign Application Priority Data

Jul. 8, 1999 (JP) ........................................... 11-194527

(51) Int. Cl.$^7$ ................................................ G05F 3/02
(52) U.S. Cl. ...................................... 327/536; 327/537
(58) Field of Search ................................ 327/534, 536, 327/543

(56) References Cited

U.S. PATENT DOCUMENTS

| | | | | |
|---|---|---|---|---|
| 4,935,644 A | * | 6/1990 | Tsujimoto | 327/536 |
| 5,216,588 A | * | 6/1993 | Bajwa et al. | 363/60 |
| 5,301,097 A | * | 4/1994 | McDaniel | 363/60 |
| 5,489,870 A | * | 2/1996 | Arakawa | 327/536 |
| 5,642,073 A | * | 6/1997 | Manning | 327/536 |
| 5,734,290 A | * | 3/1998 | Chang et al. | 327/536 |
| 5,821,805 A | * | 10/1998 | Jinbo | 327/536 |
| 5,831,844 A | | 11/1998 | Sudo | 363/60 |
| 5,889,428 A | * | 3/1999 | Young | 327/536 |
| 5,940,284 A | * | 8/1999 | Troutman | 327/536 |

FOREIGN PATENT DOCUMENTS

| | | |
|---|---|---|
| JP | 4-268294 | 9/1992 |
| JP | A 7-244990 | 9/1995 |
| JP | A 8-149799 | 6/1996 |
| JP | A 10-304653 | 11/1998 |
| JP | A 11-164545 | 6/1999 |
| WO | 99/03192 | 1/1999 |

* cited by examiner

*Primary Examiner*—Terry D. Cunningham
(74) *Attorney, Agent, or Firm*—Young & Thompson

(57) ABSTRACT

A boost circuit reduces the consumed current during a startup condition of the boost circuit. The boost circuit comprises a plurality of charge pump circuit stages, each the charge pump circuit stage having a $V_i$ input, a clock input, and a $V_o$ output, each circuit stage providing a voltage at the $V_o$ output which is higher than a voltage at the $V_i$ input, the $V_i$ input of a first of the circuit stages being connected to a power supply voltage, each of the plurality of circuit stages other than the first stage having the $V_i$ input connected to the $V_o$ output of an immediately preceding the circuit stage; wherein during a startup condition, each of the clock signals transitions from an inactive state to a reciprocating state, the transition of each of the clock signals being delayed by at least one clock cycle with respect to each transition of the clock signal supplied to each preceding stage.

8 Claims, 17 Drawing Sheets

| | 6 | 7 | 10 | 13 | 14 |
|---|---|---|---|---|---|
| 1 | 8 | 842mA | 12msec | 10.0V | 19 |
| 2 | 4 | 8 | 11 | 5.3V (0.5msec) | 20 |
| | 8 | 9 | 13 | 5.3V (0.5msec) | 21 |
| 3 | 8 | 563mA | 12msec | 17.0V | 22 |
| 4 | 4*4 | 432mA | 28msec | 20.3V | 23 |
| | 2*4 | 224mA | 28msec | 19.0V | 24 |
| 5 | 2*4 | 218mA | 26msec | 19.0V | 25 |

BOOST CIRCUIT WITH SEQUENTIALLY DELAYED ACTIVATION OF PUMP CIRCUIT STAGES

BACKGROUND OF THE INVENTION

1. Field of the Invention

The present invention relates in general to a boost circuit, and more particularly to a boost circuit which is designed in such a way as to reduce the power source current when activating the boost circuit.

2. Description of the Related Art

A configuration of a prior art example of a boost circuit is shown in FIG. 15 and a timing chart thereof is shown in FIG. 16.

In this circuit, boosting operation is terminated by setting CTL at a low level. Since output node P1 of a NAND 151 which has received that input is held at a high level irrespective of the level of the input from CLK, the boosting operation is not carried out in each of pumping circuits 158A to 158H.

On the other hand, CTL is set to a high level to allow the boosting operation. A clock signal which has been inputted to the CLK is inverted to be outputted from the NAND 151. The pumping circuits 158A to 158H, each of which has received the inverted clock signal, start the boosting operation at the same time.

Some semiconductor devices receive an external electric wave to activate the internal power source on the basis of the electric wave thus received. One example is the noncontact IC card, for which an increase of demand is expected. In such device there arises the problem that the power source voltage is reduced due to the increase of the power source current when starting the boosting operation.

In this connection, FIG. 19 is a graphical representation showing the simulation result of this circuit. In the figure, reference numeral 251 designates a waveform of a boosted voltage (VPP) and reference numeral 252 designates a waveform of a power source current (IDD). The boosted voltage of this circuit is 17.0 V and the peak current thereof is 842 µA.

Next, a circuit diagram disclosed in Japanese Patent Application Laid-open No. Hei 268294 is shown in FIG. 17 and a timing chart thereof is shown in FIG. 18.

In this circuit, a clock signal is inputted from a CLK and pumping circuits 204A to 204H each of which has received the clock signal thus inputted thereto start the boosting operation. A point of difference between this circuit and that circuit shown in FIG. 15 is that the voltage which has been boosted in the pumping circuit 204A in the previous stage is used as the power source of a level shifter 201B which is the constituent element of the pumping circuit 204B in the next stage. Likewise, the voltages which have been respectively boosted in the pumping circuits in the previous stages are used as the power sources of level shifters 201C to 201H, respectively.

However, in this boost circuit, the level shifters are used in the clock driver. As a result, since the output of each of the level shifters becomes equal to or lower than 0 V when starting the boosting operation, the switching device provided between the pumping circuits needs to be comprised of an N-channel enhancement MOS transistor having Vt which is larger than 0 V.

Therefore, the voltage which is transferred to the next stage during the boosting operation is expressed by the following expression:

$$VDD - Vt \tag{1}$$

and hence the transferred voltage is lost by Vt as compared with the prior art example.

Since the loss of voltage in the transferred voltage occurs in each of the stages of the pumping circuits 204A to 204H, there arises the problem that it takes a lot of time to boost the voltage.

In this connection, FIG. 20 is a graphical representation showing the simulation result of this circuit which has the pumping circuits of four stages. In the figure, reference numeral 261 designates a waveform of the boosting voltage (VPP), and reference numeral 262 designates a waveform of the power source current (IDD). The boosting voltage of this circuit is 5.3 V and the peak current thereof is equal to or larger than 10 mA.

In addition, FIG. 21 is a graphical representation showing the simulation result of this circuit which has the pumping circuits of eight stages. In the figure, reference numeral 271 designates a waveform of the boosted voltage (VPP) and reference numeral 272 designates a waveform of the power source current (IDD).

SUMMARY OF THE INVENTION

In light of the foregoing, the present invention has been made in order to solve the above-mentioned problems associated with the prior art, and it is therefore an object of the present invention to provide a novel boost circuit which is designed in such a way as to reduce the consumed current when activating the boost circuit.

In order to attain the above-mentioned object, the present invention adopts the following technical configurations.

The first aspect of the present invention provides a boost circuit comprising: a plurality of charge pump circuit stages, each charge pump circuit stage having a $V_i$ input, a clock input, and a $V_o$ output, each circuit stage providing a voltage at the $V_o$ output which is higher than a voltage at the $V_i$ input, the $V_i$ input of a first of the circuit stages being connected to a power supply voltage, each of the plurality of circuit stages other than the first stage having its $V_i$ input connected to the $V_o$ output of an immediately preceding circuit stage. During a startup condition, each of the clock signals transitions from an inactive state to a reciprocating state, the transition of each of the clock signals being delayed by at least one clock cycle with respect to each transition of the clock signal supplied to each preceding stage.

In addition, the second aspect of the present invention provides a boost circuit comprising a first multi-stage charge pump circuit receiving a first clock signal at a first level and an input, the first multi-stage charge pump circuit producing a first output voltage having a higher voltage level than the input voltage, a level shifter receiving the first output voltage, the level shifter having a level shifter clock input and a shifted clock output, the level shifter producing a second clock signal at the shifted clock output having a predetermined higher voltage level than an input clock signal received at the level shifter clock input, and a second multi-stage charge pump circuit receiving the first output voltage and the second clock signal, the second multi-stage charge pump circuit producing a second output voltage having a higher voltage level than the first output voltage. Each stage of the second multi-stage charge pump circuit has a clock input which receives a clock signal at the predetermined higher voltage when the multi-stage charge pump reached steady state.

According to the present invention, the charge pump circuits are prevented from starting the boosting operation at the same time when activating the boost circuit.

As a result, there is obtained the effect that it is possible to reduce the power source current consumption when starting the boosting operation.

BRIEF DESCRIPTION OF THE DRAWINGS

The above and other objects, features, and advantages of the present invention will become more apparent from the following detailed description when taken in conjunction with the accompanying drawings wherein.

DETAILED DESCRIPTION OF THE PREFERRED EMBODIMENTS

Embodiment 1

The boost circuit of the first embodiment includes: a control signal CTL which is used to control the boosting operation; a clock signal CLK; an N-channel non-doped MOS transistor 5 whose source is electrically connected to a power source VDD; a inverter 6 whose output is electrically connected to a gate of the N-channel non-doped MOS transistor 5; and pumping circuits 4A to 4H; and the clock generating circuit 7 for successively supplying respectively the clock signals.

The pumping circuits 4A to 4H comprises N-channel non-doped MOS transistors 3A to 3H, capacitors 2A to 2H and inverters 1A to 1H, respectively. The N-channel MOS transistors 3A to 3H are electrically connected in series between the N-channel non-doped MOS transistor 5 and output terminal $V_{OUT}$. One end of the capacitors 2A to 2H are respectively electrically connected to the gates of the N-channel MOS transistors 3A to 3H. The inverters 1A to 1H receive the respective clock signals at the input terminals and provide the inverted clock signals of the clock signals to the other terminals of the capacitors 2A to 2H.

Figure 1:
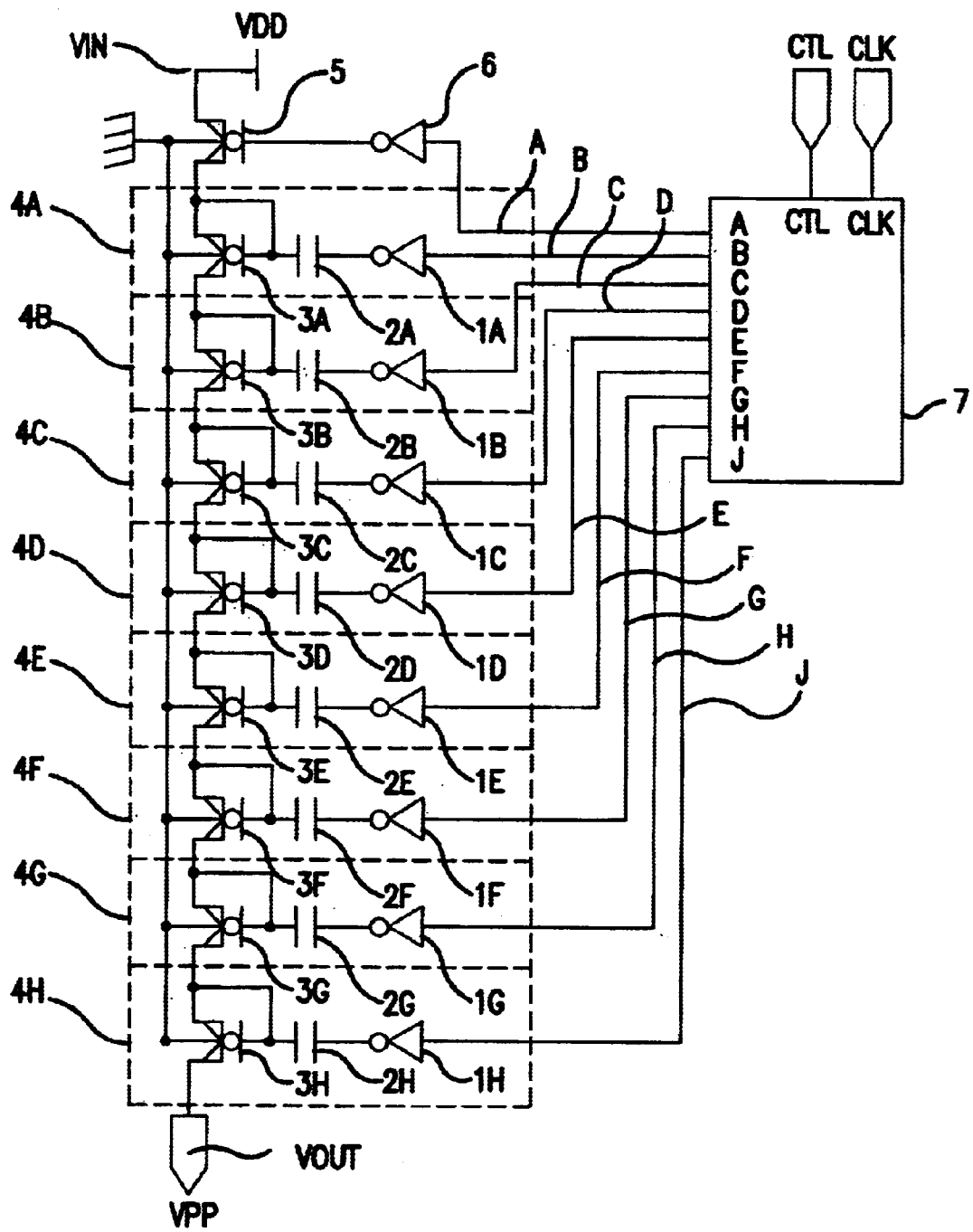
FIG. 1 is a circuit diagram showing a configuration of a boost circuit of a first embodiment of the present invention.
Figure 2:
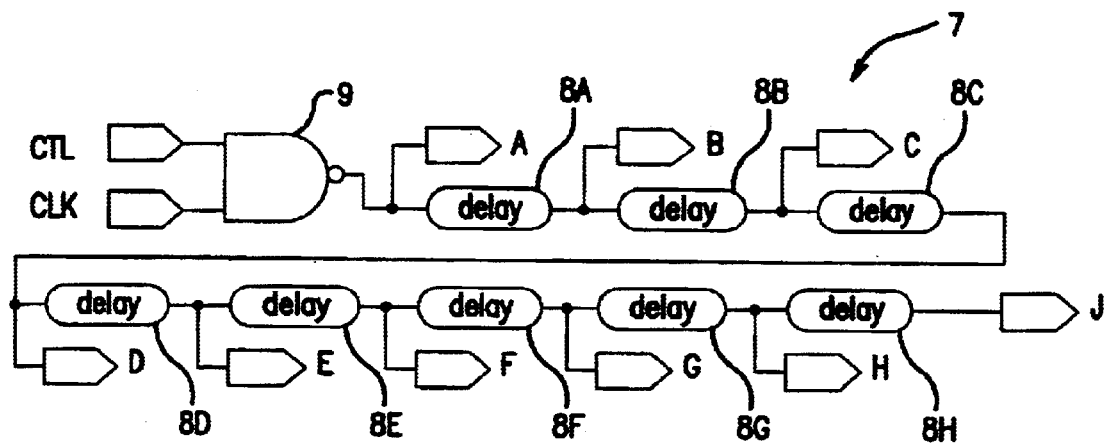
FIG. 2 is a block diagram showing a configuration of a clock generating circuit of the first embodiment.

The clock generating circuit 7, as shown in FIG. 2, includes a NAND 9 through which both of the control signal CTL and the clock signal CLK are inputted, and the delay elements 8A to 8H.

According to this construction, the pumping circuits 4A to 4H are prevented from starting the boosting operation thereof at the same time when activating the boost circuit.

As a result, there is obtained the effect that it is possible to reduce the power source current consumption when starting the boosting operation.

Then, it is assumed that the frequency of the clock signal CLK inputted from the outside is 4 MHz, and the delay value of each of the delay devices 8A to 8H, for example, is 1.5 times as large as the period of the clock signal CLK inputted from the outside. In this connection, alternatively, if the clock signals A to J are 180 degrees out-of-phase with each other in this order, then the boost circuit may be configured in such a way that the delay value of each of the delay devices 8A to 8H is 1.5 or more times as large as the period of the clock signal CLK inputted from the outside. Likewise, alternatively, the frequency of the clock signal CLK from the outside may also be equal to or lower than 4 MHz as long as the boost circuit can be operated in this state.

Figure 3:
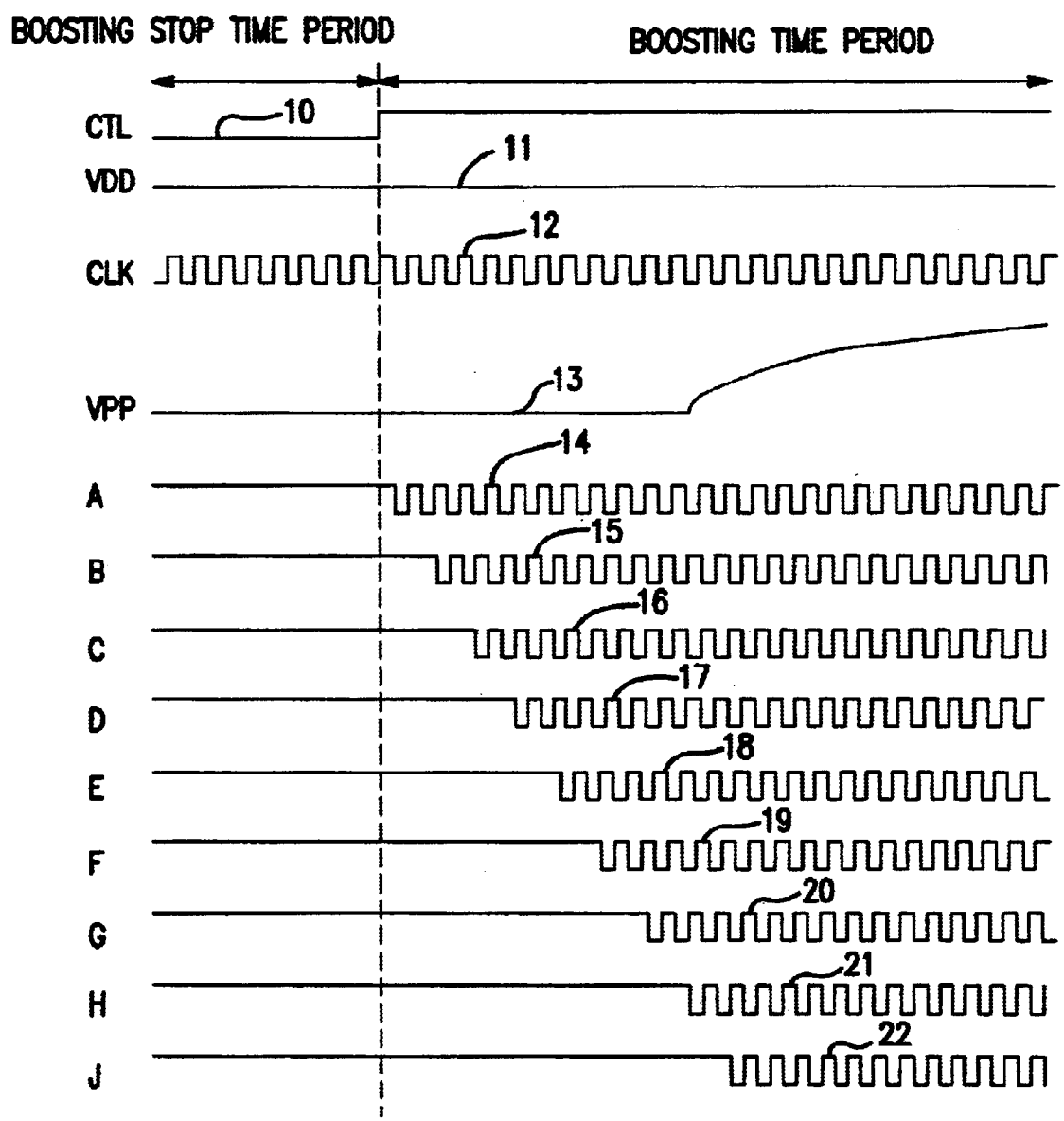
FIG. 3 is a timing chart explaining the operation of the first embodiment.

Next, the operation of this embodiment will be hereinbelow described with reference to a timing chart shown in FIG. 3.

Setting control signal CTL to low level stops the boosting operation. As a result, all of the outputs of the clock generating circuit 7 become high level to stop the boosting operation.

On the other hand, when starting the boosting operation, the control signal CTL is set to a high level. As a result, the clock signal CLK becomes valid.

Then, the clock signals A to J are successively outputted in this order from the outputs of the clock generating circuit 7 at every lapse of a predetermined time delay. For the output signal A, the clock signal is outputted in such a way as to be 180 degrees out-of-phase with respect to the clock signal CLK, and for the output signal B, the clock signal is outputted in such a way as to be in phase with the clock signal CLK and also as to be delayed with respect to the clock signal CLK by 375 nsec.

Likewise, the clock signal C is inputted in such a way as to be 180 degrees out-of-phase with the clock signal CLK and as to be delayed with respect to the clock signal CLK by 750 nsec; the clock signal D is outputted in such a way as to be in phase with the clock signal CLK and as to be delayed with respect to the clock signal CLK by 1,025 nsec; the clock signal E is outputted in such a way as to be 180 degrees out-of-phase with the clock signal CLK and as to be delayed with respect to the clock signal CLK by 1,400 nsec; the clock signal F is outputted in such a way as to be in phase with the clock signal CLK and as to be delayed with respect to the clock signal CLK by 1,775 nsec; the clock signal G is outputted in such a way as to be 180 degrees out-of-phase with respect to the clock signal CLK and as to be delayed with respect to the clock signal CLK by 2,250 nsec; the clock signal H is outputted in such a way as to be in phase with the clock signal CLK and as to be delayed with respect to the clock signal CLK by 2,625 nsec; and the clock signal J is outputted in such a way as to be 180 degrees out-of-phase with the clock signal CLK and as to be delayed with respect to the clock signal CLK by 2,900 nsec.

Now, when stopping the boosting operation, each of the outputs of the clock generating circuit 7 is held at the high level. As a result, since each of the inputs to the pumping circuits 4A to 4H also becomes high level, no boosting operation is carried out. On the other hand, when carrying out the boosting operation, the clock signal A is inputted from the clock generating circuit 7 to the pumping circuit 4A a 375 nsec time delay after the level of the input from the control signal CTL has been changed from the low level to the high level, so that the pumping circuit 4A starts the boosting operation. Next, since the clock signal B is inputted to the pumping circuit 4B a 375 nsec time delay after the pumping circuit 4A has started the boosting operation, the pumping circuit 4B starts the boosting operation. Likewise, the pumping circuits 4C to 4H start the boosting operations, respectively, at every lapse of a 375 nsec time delay after the pumping circuits in the respective previous stages have started the boosting operations.

Therefore, when activating the boost circuit, from the following expression:

$$\text{The power source current} = \Delta Q/\Delta t = \Delta V \times C/\Delta t \quad (2)$$

it becomes clear that ΔQ becomes ideally ¾ of the prior art and hence it is possible to reduce the power source current.

Figure 22:
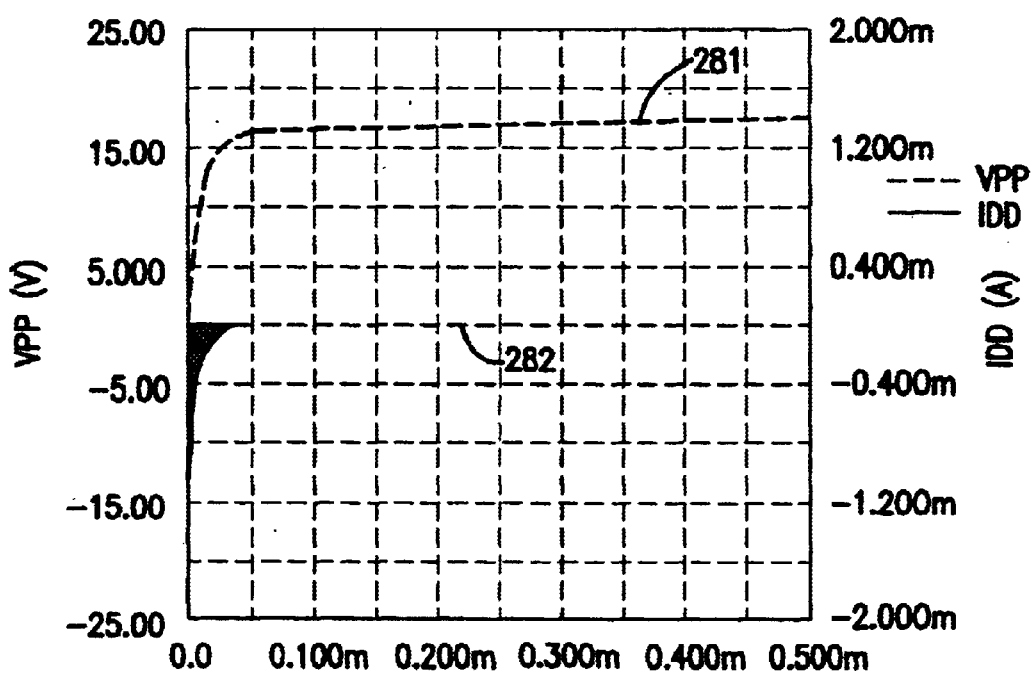
FIG. 22 is a graphical representation showing the simulation result for the boost circuit of the first embodiment shown in FIG. 1.

FIG. 22 is a graphical representation showing the simulation result of this circuit. In the figure, reference numeral 281 designates a waveform of the boosted voltage (VPP) and reference numeral 282 designates a waveform of the power source current (IDD). The boosting voltage of this circuit is 17.0 V and the peak current thereof is 553 µA.

Embodiment 2

The second embodiment features a reduction in the number of constituent elements.

Figure 4:
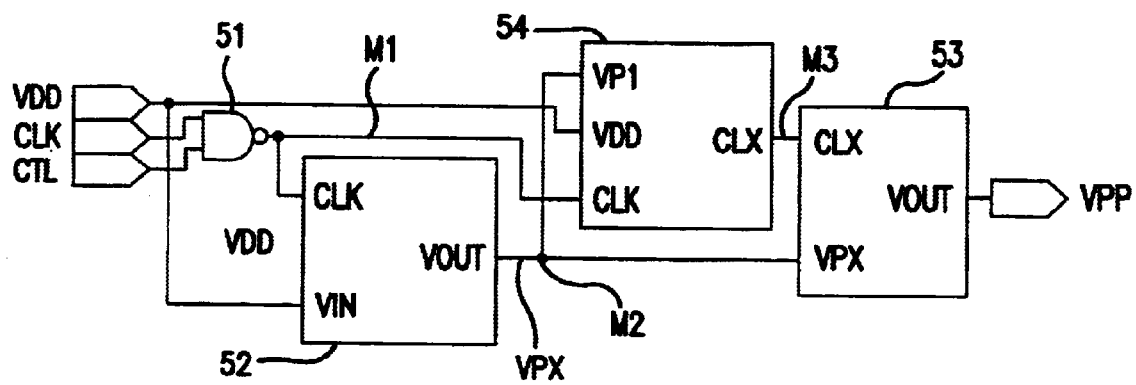
FIG. 4 is a block diagram showing a configuration of the boost circuit of a second embodiment of the present invention.

As shown in FIG. 4, the boost circuit according to the second embodiment of the present invention comprises a first boost circuit 52, second boost circuit 53 and a level shifter 54 for obtaining from the first clock signal M1 a second clock signal M3.

Figure 5:
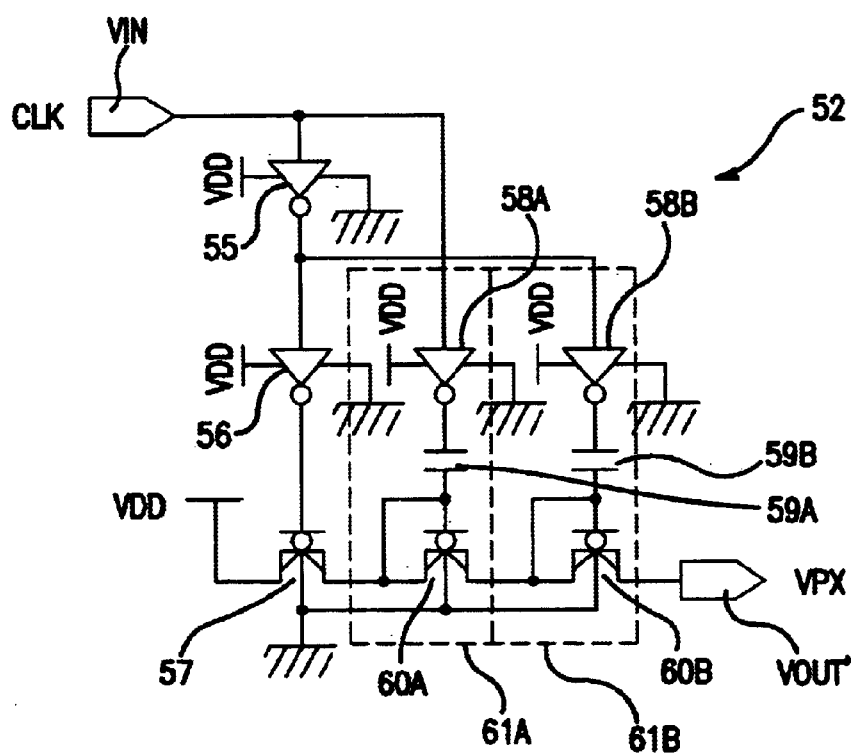
FIG. 5 is a circuit diagram showing a configuration of a first boost circuit of the second embodiment.

The first boost circuit 52, as shown in FIG. 5, comprises a clock terminal CLK receiving a first clock signal M1, an output terminal VOUT', an inverter 55 receiving the first clock signal M1, an inverter 56 receiving an output signal of the inverter 55, an N-channel MOS transistor 57 receiving an output of the inverter 56 at the gate electrode, and pumping circuits 61A and 61B.

The pumping circuits 61A and 61B have N-channel MOS transistors 60A and 60B, capacitors 59A and 59B, and inverters 58A and 58B, respectively. The N-channel MOS transistors 60A and 60B are electrically connected in series between the N-channel MOS transistor 57 and the output terminal VOUT'. One terminal of each of the capacitors 59A and 59B is electrically connected to the gate of the N-channel MOS transistors 60A and 60B, respectively. The inverter 58A receives the clock signal of the clock terminal CLK and provides the output signal to the other terminal of the capacitor 59A. The inverter 58B receives the output signal of the inverter 55 and provides the output signal to the other end of the capacitor 59B.

Figure 6:
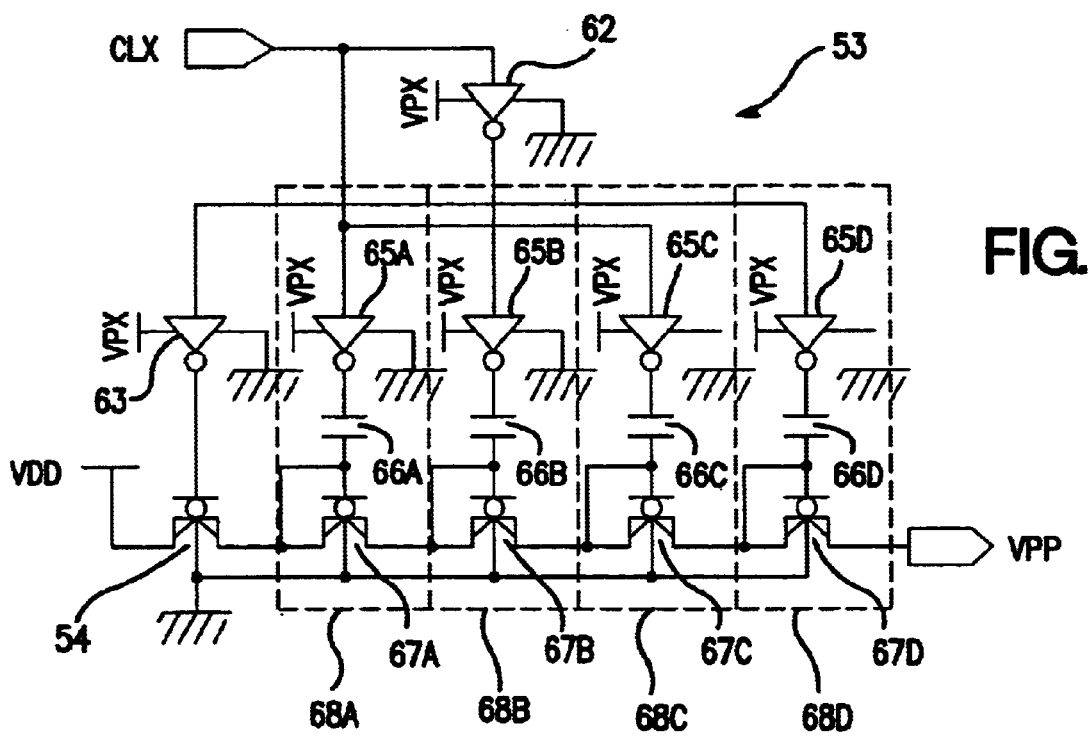
FIG. 6 is a circuit diagram showing a configuration of a second boost circuit of the second embodiment.

The second boost circuit 53, as shown in FIG. 6, has a clock terminal CLX receiving the second clock signal which is an output of the level shifter 54, an output terminal VOUT, an inverter 62 receiving the second clock signal, an inverter 63 receiving an output signal of the inverter 62, an N-channel MOS transistor 64 receiving an output of the inverter 63 at the gate electrode, and pumping circuits 68A to 68D.

The pumping circuits 68A to 68D have N-channel MOS transistors 67A to 67D, capacitors 66A to 66D, and inverters 65A to 65D, respectively. The N-channel MOS transistors 67A to 67D are electrically connected in series between the N-channel MOS transistor 64 and the output terminal VOUT. The power supply terminals of the inverters 62 to 64 and 65A to 65D receive the output signal of the first boost circuit 52.

Figure 7:
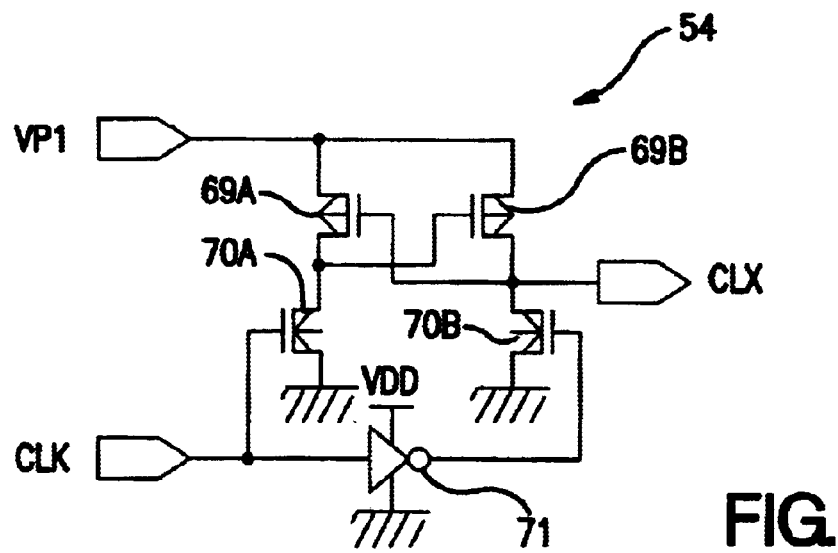
FIG. 7 is a circuit diagram showing a configuration of a level shifter of the second embodiment.
Figure 10:
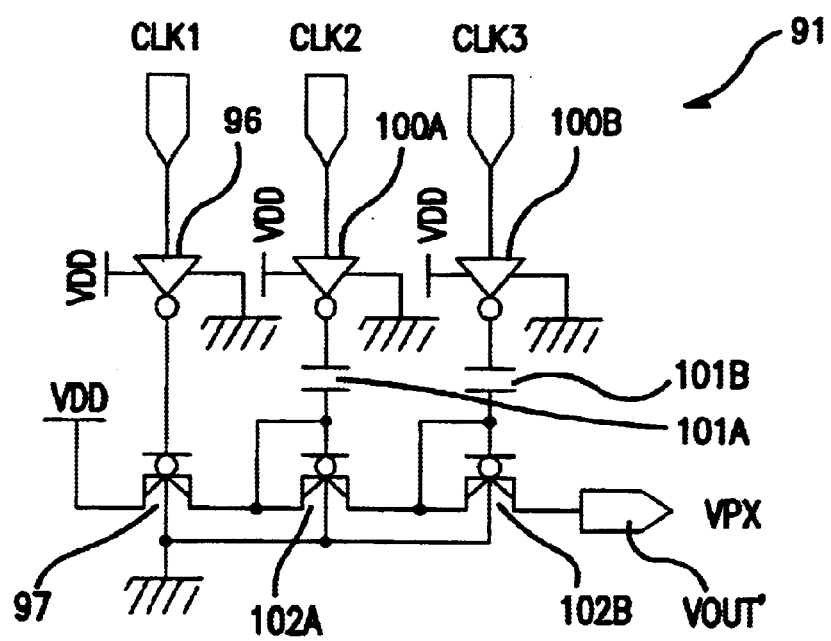
FIG. 10 is a circuit diagram showing a configuration of a first boost circuit of a third embodiment.

The level shifter 54, as shown in FIG. 7, includes: P-channel MOS transistors 69A and 69B sources of which are electrically connected to a power source terminal VP1; an N-channel MOS transistor 70A whose drain is electrically connected to the P-channel MOS transistor 69A and a source of which is electrically connected to ground; and an N-channel MOS transistor 70B a drain of which is electrically connected to the P-channel MOS transistor 69B and a source of which is electrically connected to ground, wherein a gate of the P-channel MOS transistor 69A is electrically connected to a drain of the P-channel MOS transistor 69B; a gate of the P-channel MOS transistor 69A is electrically connected to a drain of the P-channel MOS transistor 69A; the clock signal CLK is inputted to a gate of the N-channel MOS transistor 70A; a signal which has been obtained by inverting a clock signal CLK in an inverter 71 is inputted to a gate of the N-channel MOS transistor 70B; and a signal CLX which is in phase with the clock signal CLK and which has been level-shifted is generated from the drain of the P-channel MOS transistor 69B.

Thus, in the boost circuit of the second embodiment, the prior art boost circuit having eight stages in total is divided into the two boost circuits. That is, the first boost circuit 52 in the previous stage is configured in such a way as to have the two stages of the pumping circuits 61A and 61B, and the second boost circuit 53 in the after stage is configured in such a way as to have the four stages of the pumping circuits 68A to 68D. In addition, the boosted voltage which is obtained in the first boost circuit 52 in the previous stage is employed as the power source for the second boost circuit 53 in the after stage.

In this connection, each of the power source of the inverters 62 and 63 for controlling the MOS transistor 64 of the second boost circuit of this circuit and the power source of the inverters 65A to 65D for carrying out the electric charge accumulation/transfer of each of the capacitors 66A to 66D is the output voltage VPP of the first boost circuit 52.

Figure 8:
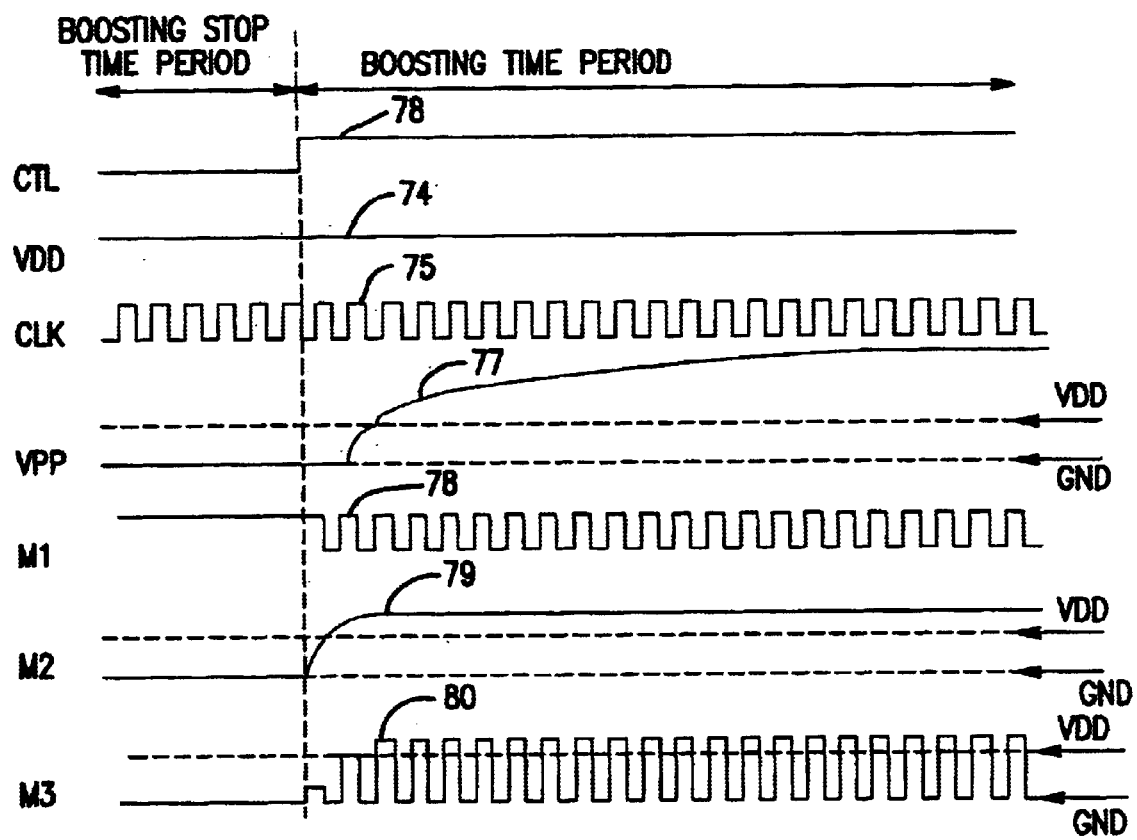
FIG. 8 is a timing chart explaining the operation of the second embodiment.
Figure 9:
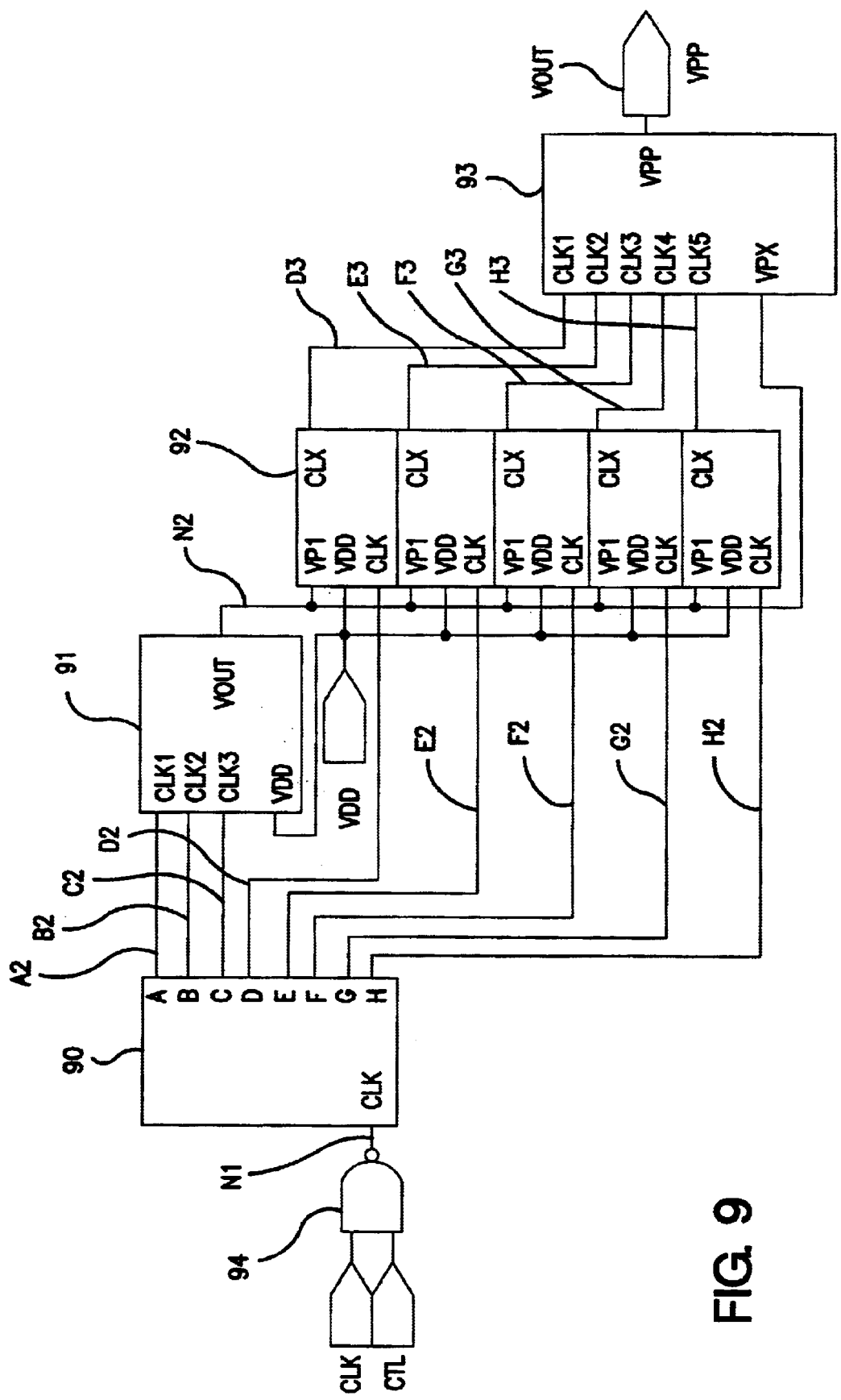
FIG. 9 is a block diagram showing a configuration of a third embodiment of the present invention.
Figure 11:
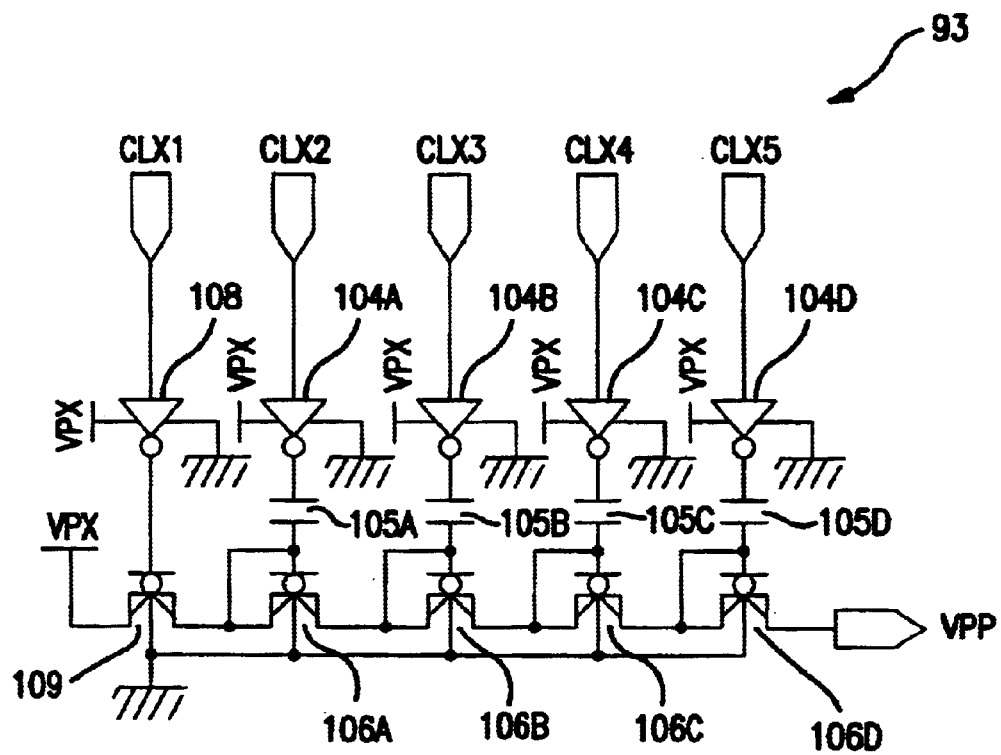
FIG. 11 is a circuit diagram showing a configuration of a second boost circuit of the third embodiment.
Figure 12:
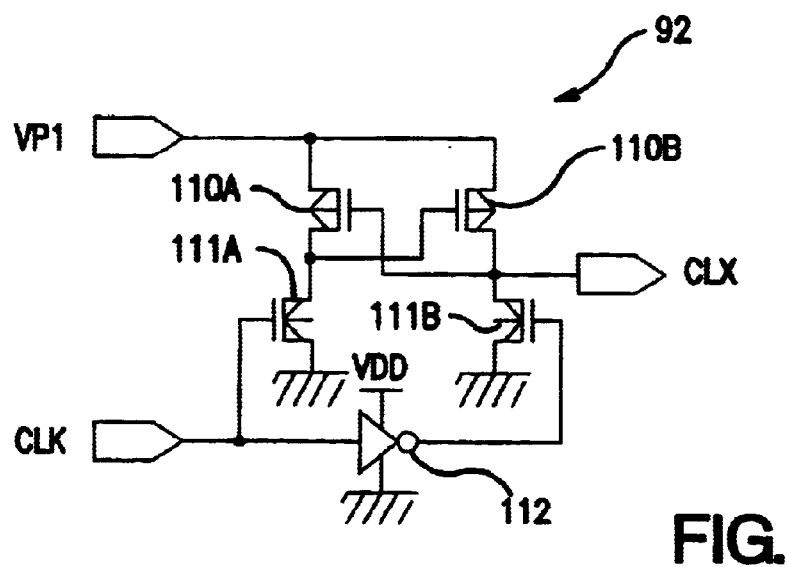
FIG. 12 is a circuit diagram showing a configuration of a level shifter of the third embodiment.
Figure 13:
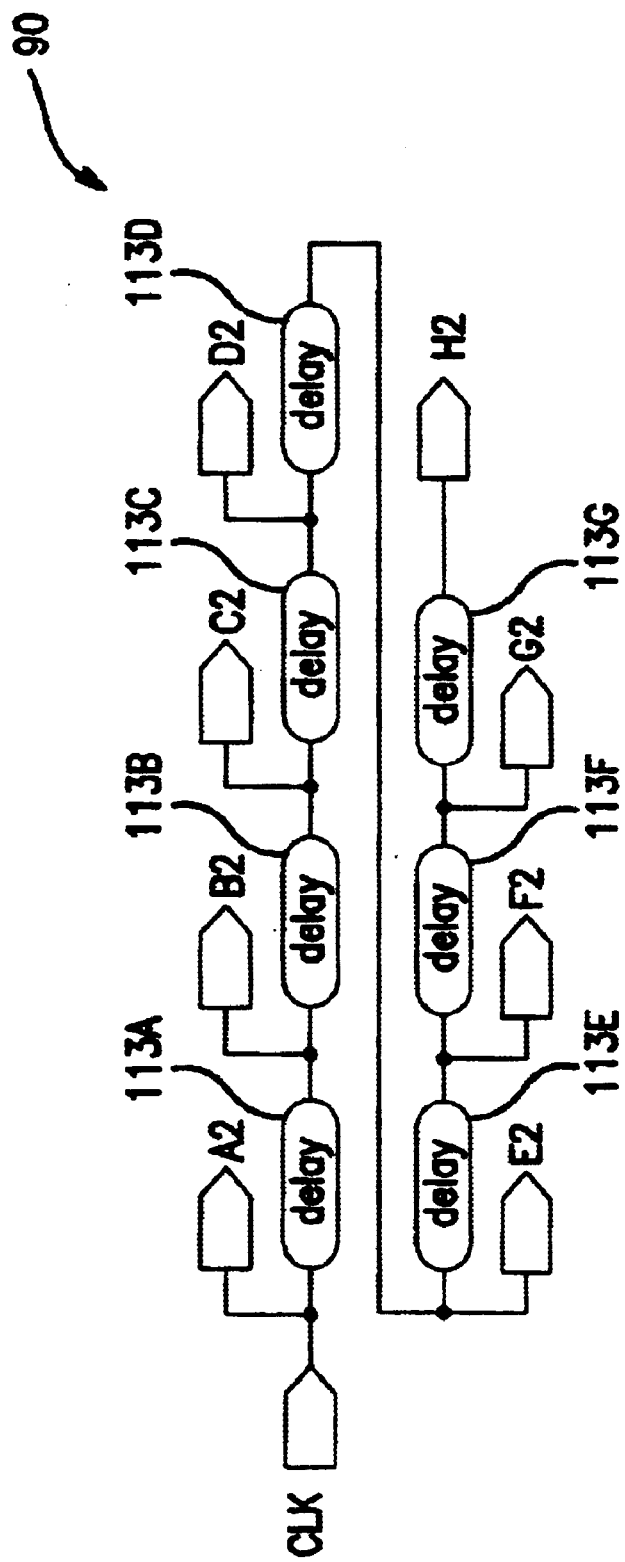
FIG. 13 is a block diagram showing a configuration of a clock generating circuit of the third embodiment.
Figure 14:
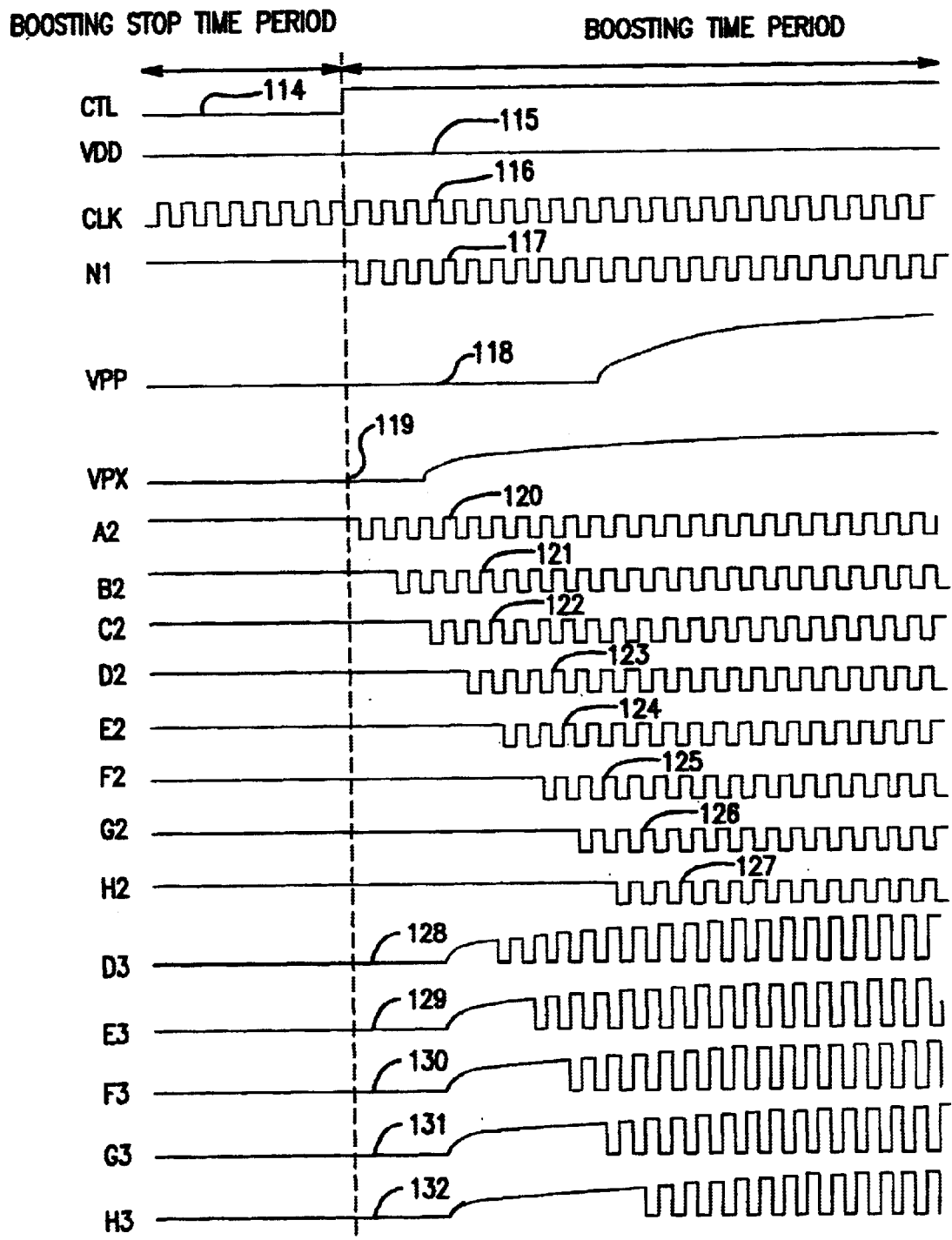
FIG. 14 is a timing chart explaining the operation of the third embodiment.
Figure 15:
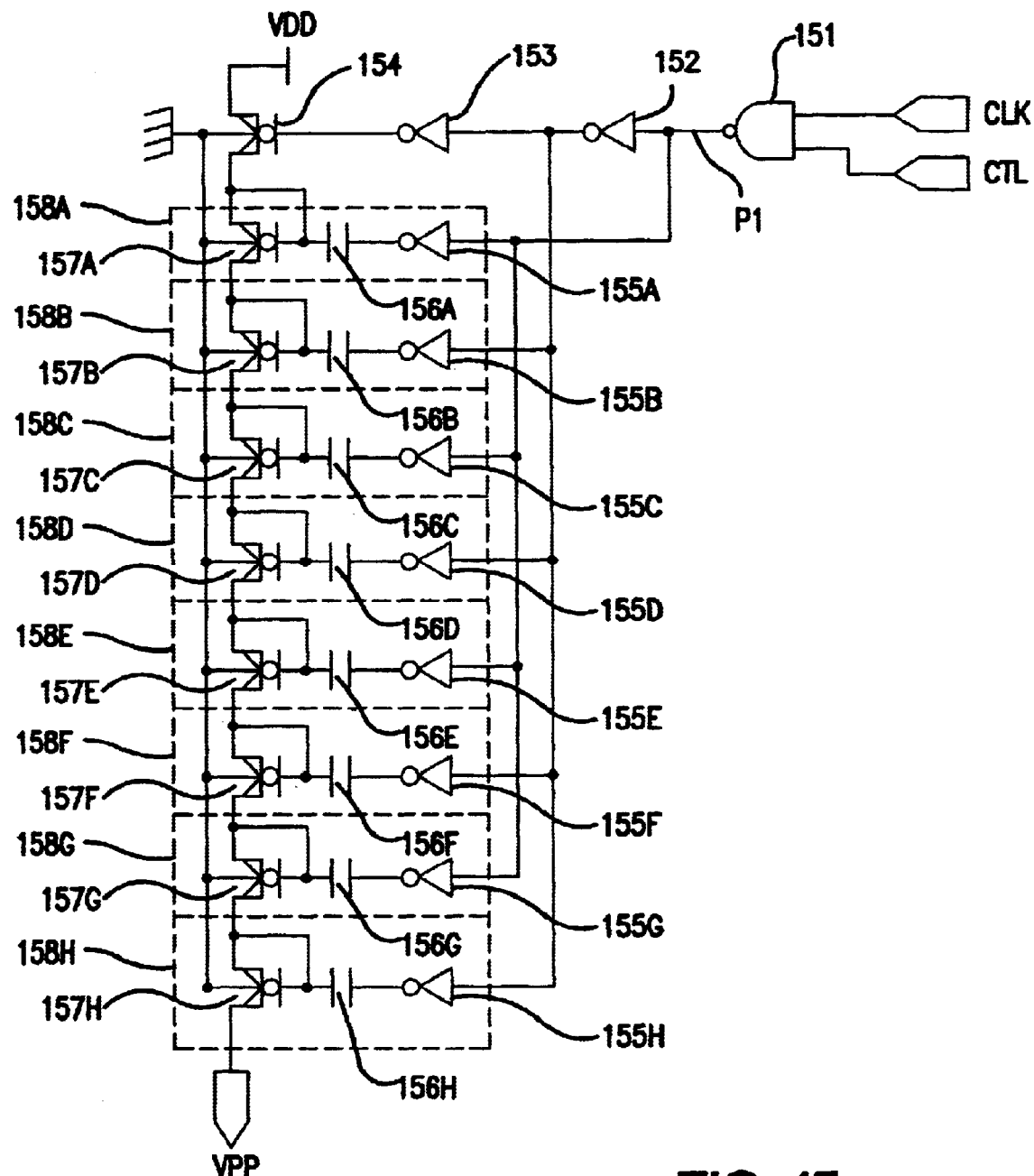
FIG. 15 is a circuit diagram showing a configuration of a boost circuit of a prior art example.
Figure 16:
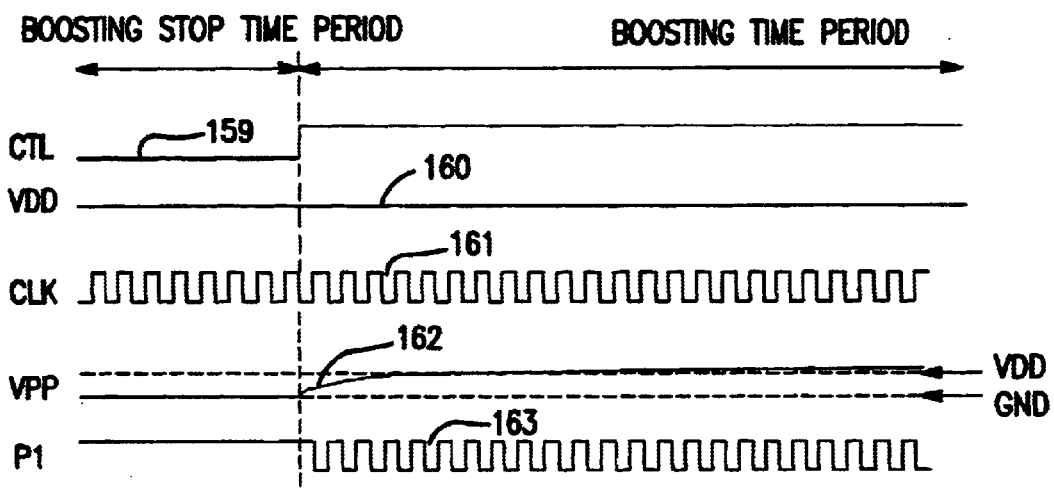
FIG. 16 is a timing chart explaining the operation of the boost circuit of the prior art example shown in FIG. 15.
Figure 18:
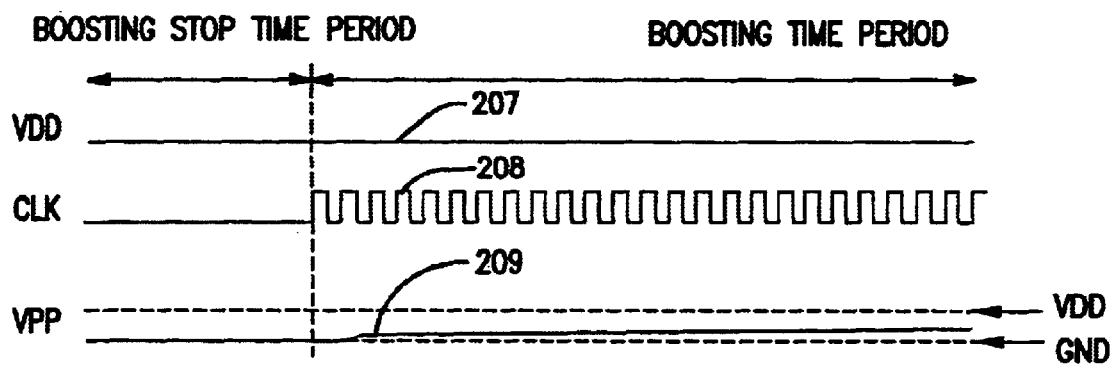
FIG. 18 is a timing chart explaining the operation of the boost circuit of another prior art example shown in FIG. 17.
Figure 17:
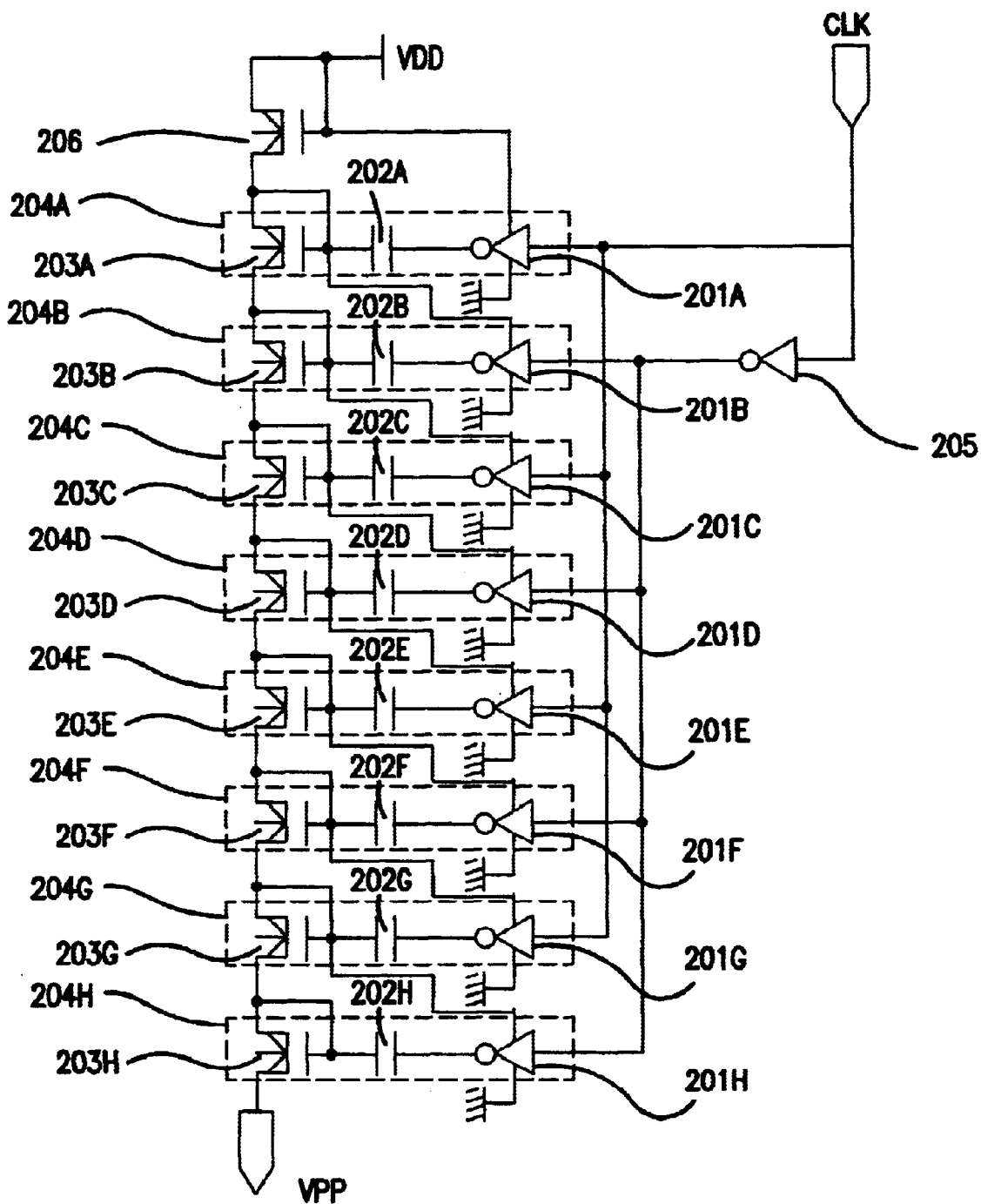
FIG. 17 is a circuit diagram showing a configuration of the boost circuit of another prior art example.
Figure 19:
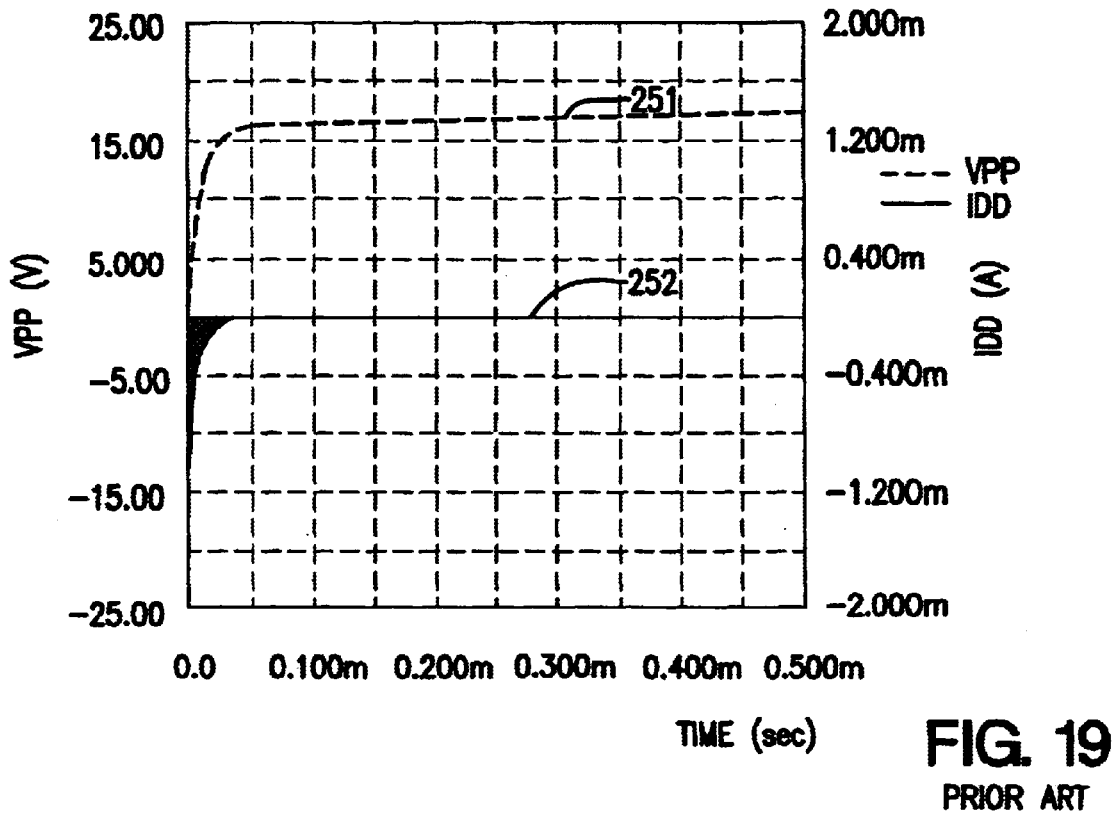
FIG. 19 is a graphical representation showing the simulation result for the boost circuit of the prior art example shown in FIG. 15.
Figure 20:
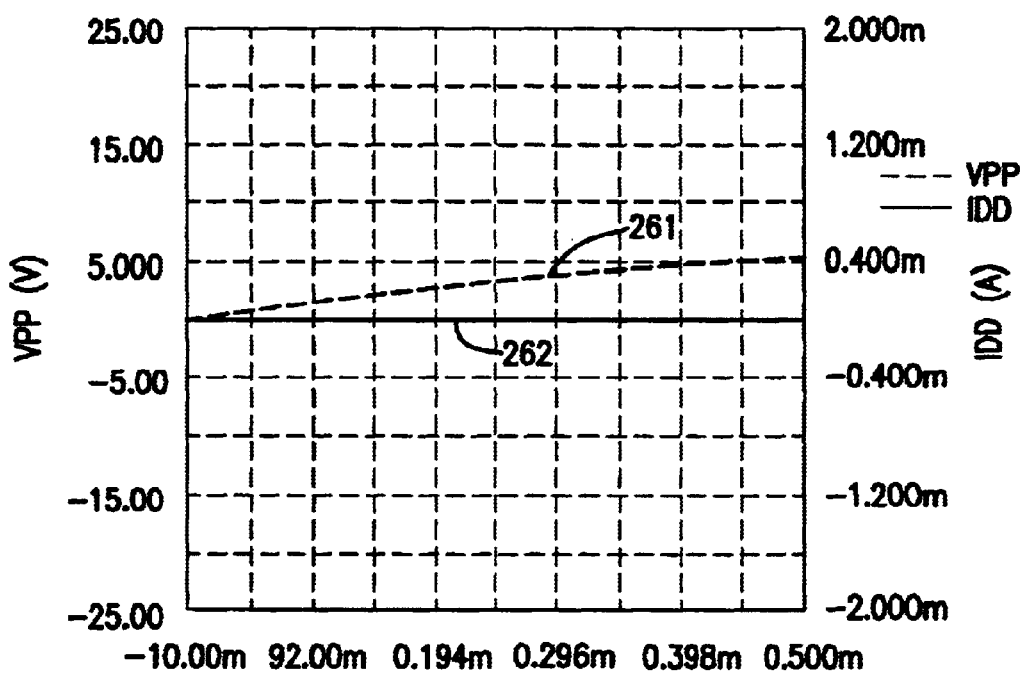
FIG. 20 is a graphical representation showing the simulation result for the boost circuit of another prior art example shown in FIG. 17.
Figure 21:
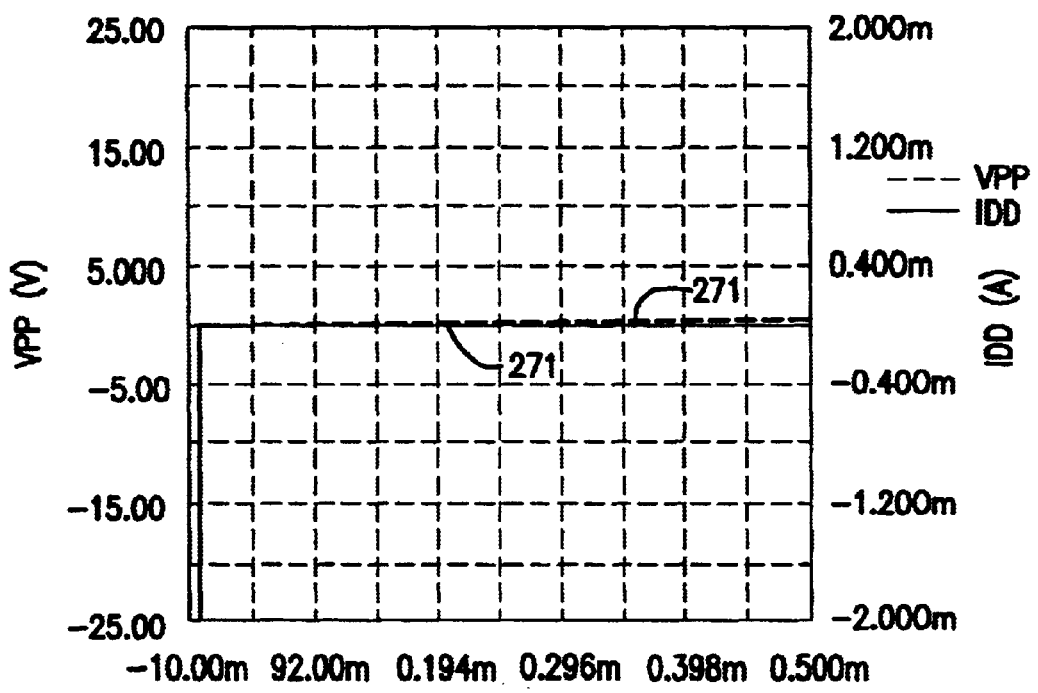
FIG. 21 is a graphical representation showing the simulation result for the boost circuit which is configured by changing the configuration of the boost circuit of another prior art example shown in FIG. 17.

Next, the description will hereinbelow be given with respect to the circuit of the second embodiment with reference to a timing chart shown in FIG. 8.

At the time when the level of the control signal CTL has been changed from the low level to the high level when starting the boosting operation so that the clock signal is valid, the first boost circuit starts the boosting operation. However, since the clock signal CLX is not inputted from the level shifter 54 to the boost circuit 53 until the boosted voltage VPP of the first boost circuit 52 has been boosted up to the power source voltage with which the level shifter 54 can be operated, the second boost circuit 53 does not carry out the boosting operation at all.

Therefore, at the time when starting the boosting operation, only the first boost circuit 52 carries out the boosting operation. Thus, since the number of stages of the pumping circuits is two, which is ¼ of the number of prior art stages, i.e., the eight stages, from the expression (2), it becomes clear that ideally, the power source current can be reduced down to ¼ of the prior art example.

In addition, the prior art boosted voltage is expressed by the following expression:

$$VPP = (\text{the power source voltage } VDD) \times (\text{the number of stages of the pumping circuits of the boosting circuit}) \quad (3)$$

Therefore, in the prior art circuit, the following expression is established:

$$VPP = VDD \times 8 \text{ stages} = 8VDD \quad (4)$$

whereas in the second embodiment, the following expression is established:

$$VPP = (\text{the boosted voltage of the boost circuit } 52) \times (\text{the number of stages of the boost circuit } 53) = 2VDD \times 4 = 8VDD \quad (5)$$

Thus, it becomes clear that though the number of stages of the pumping circuits is decreased by two, by only adding the level shifter thereto, it is possible to obtain the boosted voltage which is equal to that of the prior art circuit.

In addition, there is obtained the effect that the number of stages of the pumping circuits of the boost circuit in the first stage is made into four stages, whereby with a total of eight stages of the pumping circuits, as in the prior art, ideally, the boosted voltage can be obtained which is 2 times as large as that of the prior art.

Figure 23:
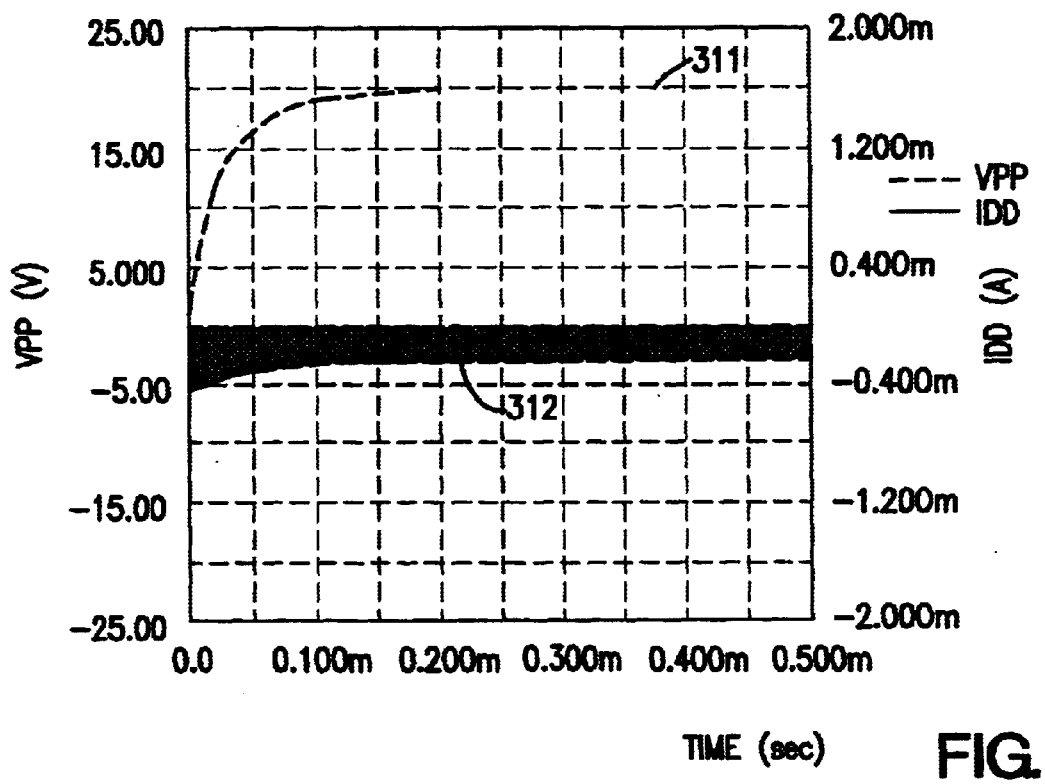
FIG. 23 is a graphical representation showing the simulation result for the boost circuit of the second embodiment shown in FIG. 4.

FIG. 23 is a graphical representation showing the simulation result of this circuit in which each of the first boost circuit 52 and the second boost circuit 53 is configured in such a way as to have four stages. In the figure, reference numeral 311 designates a waveform of the boosted voltage (VPP) and reference numeral 312 designates a waveform of the power source current (IDD). The boosted voltage of this circuit is 20.3 V and the peak current thereof is 432 µA.

Figure 24:
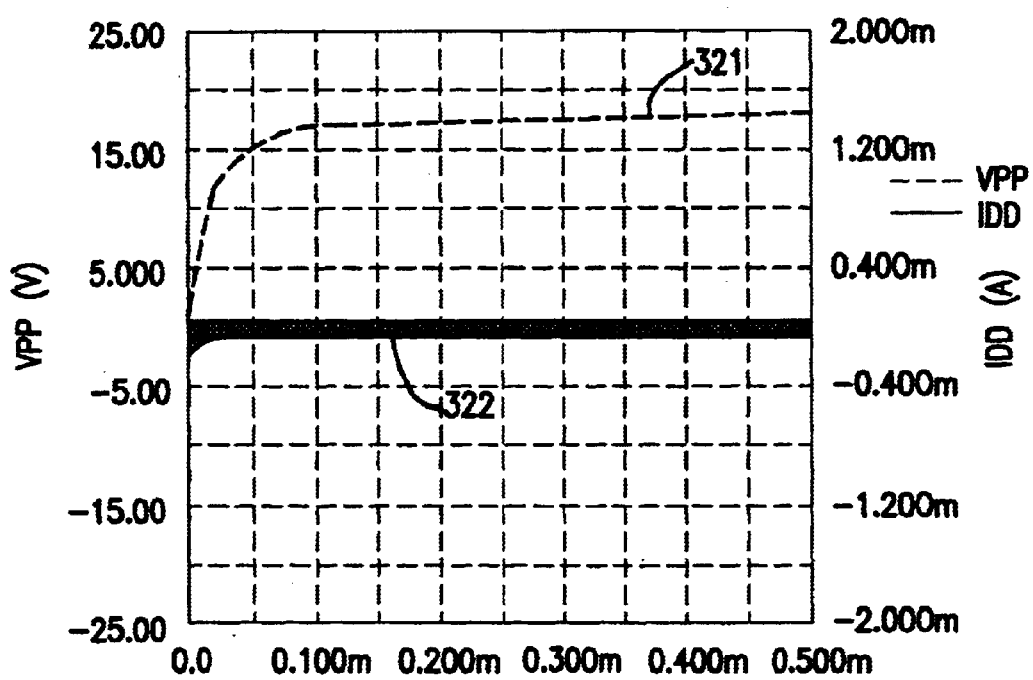
FIG. 24 is a graphical representation showing the simulation result for the boost circuit which is obtained by changing the configuration of the boost circuit of the second embodiment shown in FIG. 4.

In addition, FIG. 24 is a graphical representation showing the simulation result for this circuit in which the first boost circuit 52 is configured in such a way as to have two stages, and the second boost circuit 53 is configured in such a way as to have four stages. In the figure, reference numeral 321 designates a waveform of the boosted voltage (VPP) and reference numeral 322 designates a waveform of the power source current (IDD). The boosted voltage of this circuit is 19.0 V and the peak current thereof is 224 µA.

Embodiment 3

As shown in FIGS. 9 to 14, the third embodiment of the boost circuit is configured in such a way that the first embodiment of the boost circuit is combined with the second embodiment of the boost circuit.

That is, in the same manner as that in the first embodiment, the clock signals A2 to C2 are applied to a first boost circuit 91 at every lapse of the successive time delay using a clock generating circuit 90.

In addition, in the same manner as that in the first embodiment, the clock signals D3 to H3 are applied to a second boost circuit 93 at every lapse of the successive time delay, and also in the same manner as that in the second embodiment, such clock signals are successively supplied to the second boost circuit 93 through the level shifter 91 in the same manner as that in the second embodiment.

Figures 25, 26:
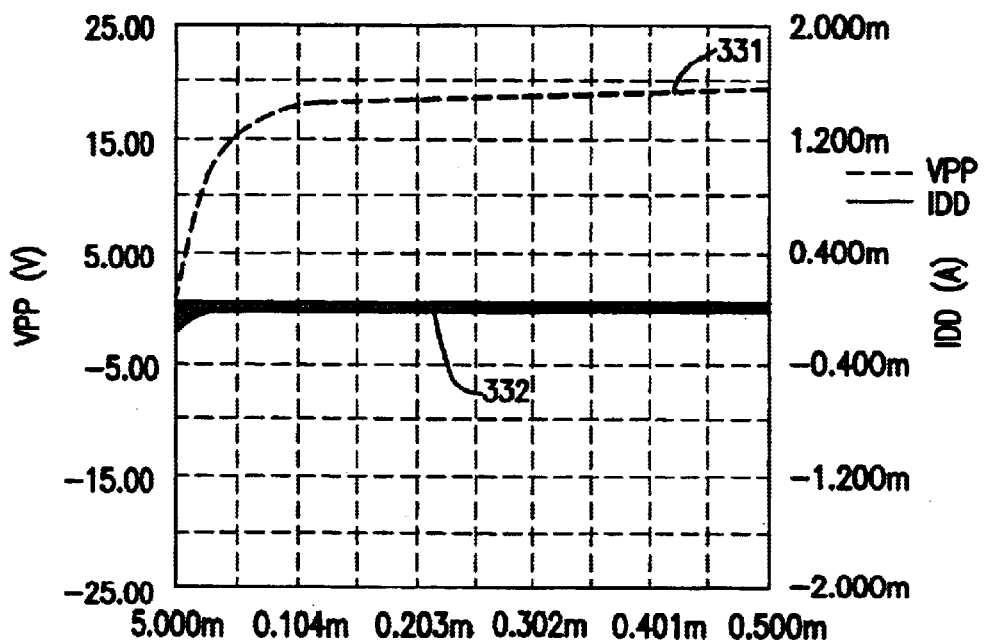
FIG. 25 is a graphical representation showing the simulation result for the boost circuit of the third embodiment shown in FIG. 9.
FIG. 26 is a diagram showing the simulation results of the peak current, the boosting time and the boosted voltage in the individual boost circuits.

FIG. 25 is a graphical representation showing the simulation result of this circuit. In the figure, reference numeral 331 designates a waveform of the boosted voltage (VPP) and reference numeral 332 designates a waveform of the power source current (IDD). The boosted voltage of this circuit is 19.0 V and the peak current thereof is 218 µA.

Therefore, the boost circuit of the third embodiment provides the greatest reduction of power source current among the above-mentioned three boost circuits of the first to the third embodiments.

Since the boost circuit according to the present invention is configured in the manner as described above, it is possible to reduce the current when activating the boost circuit.

The present invention is not limited by the embodiments and it is obvious that they can be modified within the spirit and the scope of the present invention.

What is claimed is:

1. A boost circuit comprising:
   a plurality of charge pump circuit stages, each said charge pump circuit stage having a $V_i$ input, a capacitor having a terminal that receives a clock signal, and a $V_o$ output, each said circuit stage providing a voltage at the $V_o$ output which is higher than a voltage at the $V_i$ input, the $V_i$ input of a first of the circuit stages being connected to a power supply voltage, each of the plurality of circuit stages other than the first stage having said $V_i$ input connected to said $V_o$ output of an immediately preceding said circuit stage;
   wherein during a startup condition, each said clock signal transitions from an inactive state to a reciprocating state, said transition of each said clock signal being delayed by at least one clock cycle with respect to each said transition of said clock signal supplied to each preceding stage.

2. The boost circuit as claimed in claim 1, wherein said plurality of charge pump circuit stages comprises at least three said circuit stages.

3. The boost circuit as claimed in claim 1, wherein each said charge pump circuit stage comprises a MOS transistor, and wherein another terminal of said capacitor is connected to a gate electrode of said MOS transistor and a first terminal of said MOS transistor, said first terminal of said MOS transistor being connected to said $V_i$ input, a second terminal of said MOS transistor being connected to said $V_o$ output.

4. The boost circuit as claimed in claim 1, further comprising a clock generating circuit, said clock generating circuit providing a separate said clock signal for each said charge pump circuit stage, said clock generating circuit comprising delay elements to provide said delay between said clock transitions.

5. A boost circuit comprising:

a first multi-stage charge pump circuit receiving a first clock signal and an input voltage, the first multi-stage charge pump circuit producing a first output voltage having a higher voltage level than said input voltage, a level shifter receiving said first output voltage, said level shifter having a level shifter clock input and a shifted clock output, said level shifter producing a second clock signal at the shifted clock output having a predetermined higher voltage level than an input clock signal received at the level shifter clock input, and a second multi-stage charge pump circuit receiving said first output voltage and said second clock signal, said second multi-stage charge pump circuit producing a second output voltage having a higher voltage level than said first output voltage, wherein each stage of the second multi-stage charge pump circuit has a clock input which receives a clock signal at said predetermined higher voltage when said level shifter reached steady state, wherein said first multi-stage charge pump circuit comprises a plurality of first charge pump circuit stages, each said first charge pump circuit stage having a first $V_i$ input, a first clock input that receives said first clock signal, and a first $V_o$ output, each said first circuit stage providing a voltage at the first $V_o$ output which is higher than a voltage at the first $V_i$ input, the first $V_i$ input of a first stage of the first circuit stages being connected to a power supply voltage, each of the plurality of first circuit stages other than the first stage of the first circuit stages having said first $V_i$ input connected to said first $V_o$ output of an immediately preceding said first circuit stage, and said second multi-stage charge pump circuit comprising a plurality of second charge pump circuit stages, each said second charge pump circuit stage having a second $V_i$ input, a second clock input that receives said second clock signal, and a second $V_o$ output, each said second circuit stage providing a voltage at the second $V_o$ output which is higher than a voltage at the second $V_i$ input, the second $V_i$ input of a first stage of the second circuit stages receiving said first output voltage, each of the plurality of second circuit stages other than the first stage of the second circuit stages having said second $V_i$ input connected to said second $V_o$ output of an immediately preceding said second circuit stage, wherein during a startup condition, each of said first clock signals transitions from an inactive state to a reciprocating state, said transition of each of said first clock signals being delayed by at least one clock cycle with respect to said transition of said first clock signal supplied to each preceding stage, and each of said second clock signals transitions from an inactive state to a reciprocating state, said transition of each of said second clock signals being delayed by at least one clock cycle with respect to said transition of said second clock signal supplied to each preceding stage.

6. The boost circuit as claimed in claim 5, wherein each said first charge pump circuit stage comprises a capacitor and a MOS transistor, one terminal of said capacitor receiving said first clock signal, another terminal of said capacitor being connected to a gate electrode of said MOS transistor and a first terminal of said MOS transistor, said first terminal of said MOS transistor being connected to said first $V_i$ input, a second terminal of said MOS transistor being connected to said first $V_o$ output.

7. The boost circuit as claimed in claim 5, wherein each said second charge pump circuit stage comprises a capacitor and a MOS transistor, one terminal of said capacitor receiving said second clock signal, another terminal of said capacitor being connected to a gate electrode of said MOS transistor and a first terminal of said MOS transistor, said first terminal of said MOS transistor being connected to said second $V_i$ input, a second terminal of said MOS transistor being connected to said second $V_o$ output.

8. A boost circuit comprising:

a power source line;

an output terminal from which a boosted voltage is derived;

at least first, second and third transistors electrically connected in series between said power source line and said output terminal, said second transistor being inserted between said first and third transistors;

at least first, second and third capacitors each having a first end and a second end, the first ends of said first, second and third capacitors being electrically connected to gates of said first, second and third transistors, respectively;

a clock generator coupled to supply first, second and third clock signals to the second ends of said first, second and third capacitors, respectively, said first clock signal being in phase with said third clock signal and said second clock signal is in different phase from said third clock signal so that said boosted voltage is derived from said output terminal, said clock generator starting to supply said third clock signal to the second end of said third capacitor at a first timing that is delayed from a second timing at which said first clock signal is started to be supplied to the second end of said first capacitor;

a fourth transistor inserted in series between said power supply line and said first transistor, said clock generator being further coupled to supply a fourth clock signal to a gate of said fourth transistor, said fourth clock signal being in phase with said second clock signal, said second clock signal being started to be supplied to the second end of said second capacitor at a third timing that is delayed from a fourth timing at which said fourth clock signal is started to be supplied to said fourth transistor, wherein said second timing occurs between said third and fourth timings and said third timing occurs between said first and second timings, and wherein said first to fourth timings occurs such that at least one clock cycle exists between a preceding timing and a succeeding timing.

* * * * *